United States Patent [19]

Frank et al.

[11] Patent Number: 5,385,366
[45] Date of Patent: Jan. 31, 1995

[54] AIR BAG DEFLECTION SHIELD

[75] Inventors: Frederick W. Frank, Tipp City, Ohio; Benjamin M. Herr, IV, Clinton Township, Macomb Co., Mich.

[73] Assignee: General Motors Corporation, Detroit, Mich.

[21] Appl. No.: 116,200

[22] Filed: Sep. 7, 1993

[51] Int. Cl.⁶ ............................................. B60R 21/20
[52] U.S. Cl. .................................. 280/728 B; 280/732
[58] Field of Search ................ 280/728 B, 732, 728 R

[56] References Cited

U.S. PATENT DOCUMENTS

| | | | |
|---|---|---|---|
| 4,911,471 | 3/1990 | Hirabayashi | 280/732 |
| 5,062,663 | 11/1991 | Satoh | 280/728 B |
| 5,096,221 | 3/1992 | Combs et al. | 280/732 |
| 5,306,042 | 4/1994 | Frank | 280/728 B |
| 5,308,111 | 5/1994 | Sommer | 280/728 B |

*Primary Examiner*—Richard M. Camby
*Assistant Examiner*—Paul N. Dickson
*Attorney, Agent, or Firm*—Charles E. Leahy

[57] ABSTRACT

According to the invention, a vehicle has an air bag module mounted beneath an opening in a vehicle panel. The module includes an inflatable air bag for deployment through the opening. A cover door closes the opening and is hingedly connected to the vehicle panel for movement away from the opening. An air bag deflection shield is underlying and separate from the cover door and overlying the air bag and module. The deflection shield has a forward edge hingedly connected to the module to enable the inflating air bag to pivot the deflection shield away from the module so that the deflection shield engages and moves the cover door away from the opening. A flexible strap limits the pivotal movement of the deflection shield to a predetermined position such that upon air bag deployment, the deflection shield directs the inflating air bag rearwardly and downwardly towards a vehicle occupant and shields the cover door from contact by the inflating air bag.

12 Claims, 1 Drawing Sheet

U.S. Patent    Jan. 31, 1995    5,385,366
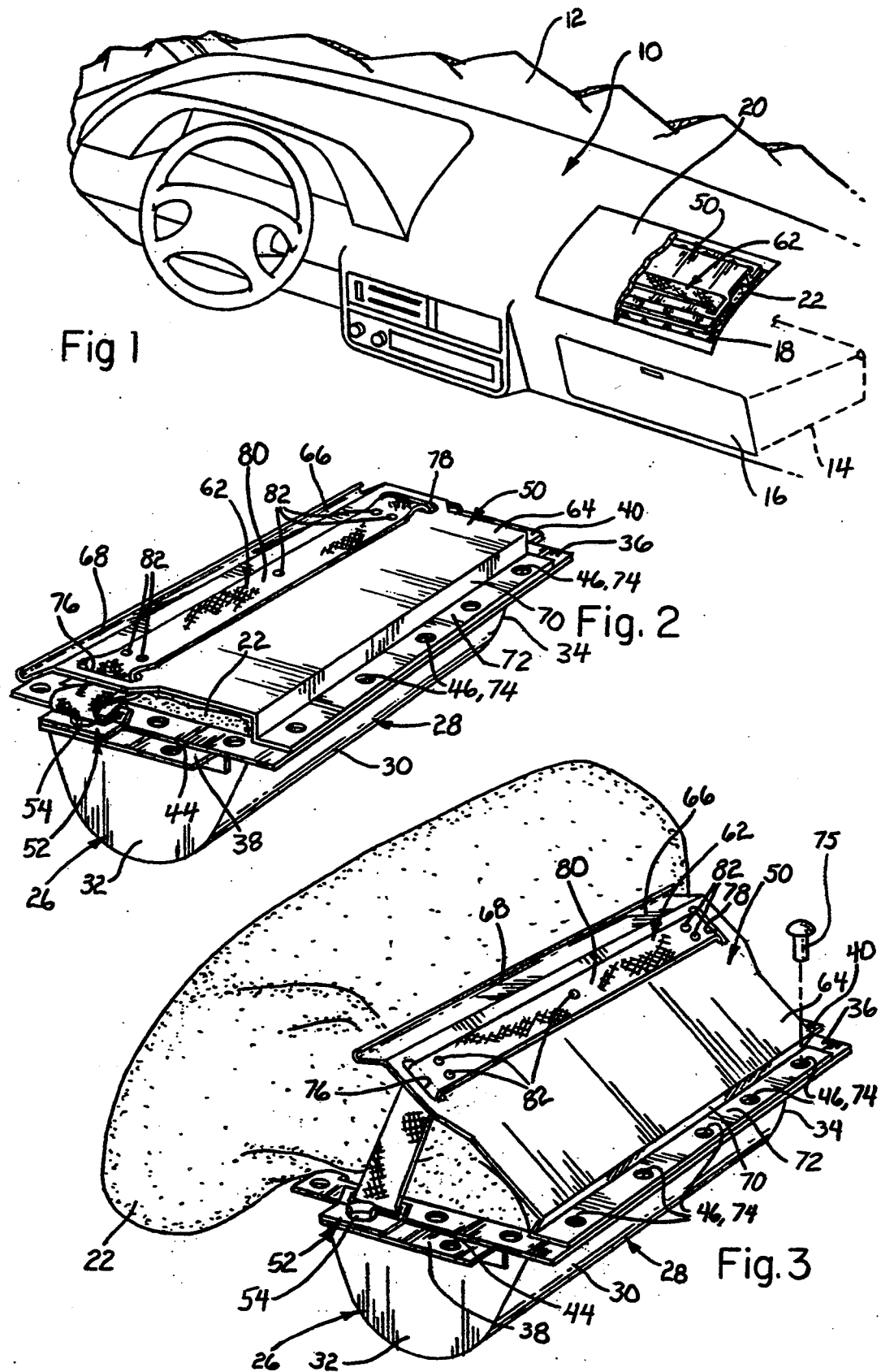

AIR BAG DEFLECTION SHIELD

The invention relates to an air bag assembly in which an air bag is deployed through an opening in a vehicle panel closed by a cover door, and more particularly to an air bag deflection shield which directs the inflating air bag rearwardly and downwardly towards a vehicle occupant and shields the cover door from contact by the inflating air bag.

BACKGROUND OF THE INVENTION

It is well known in motor vehicles to have a vehicle panel, such as an instrument panel, with a deployment opening through which an inflatable air bag is deployed. The opening in the vehicle panel is typically closed by a cover door to normally conceal the undeployed air bag from view. Conventional cover doors are hingedly mounted to the vehicle panel so that the inflating air bag forcibly moves the cover door out of the opening to permit deployment of the air bag through the opening.

It is often desirable to direct the inflating air bag rearwardly and downwardly towards a vehicle occupant, particularly when the deployment opening is located on an upper surface of the instrument panel. In some cases, the inflating air bag may be directed by a cover door which has side straps or tethers to limit the pivotal movement of the cover door away from the opening. However, using the cover door to direct the inflating air bag has the disadvantage not only of requiring side straps or tethers on the cover door, but also of requiring significant reinforcement of the cover door to withstand forces by the inflating air bag.

Thus, it would be desirable to provide a device, separate from the cover door, to direct the inflating air bag rearwardly and downwardly towards a vehicle occupant and to shield the cover door from contact by the inflating air bag.

SUMMARY OF THE INVENTION

According to the invention, a vehicle has an air bag module mounted beneath an opening in a vehicle panel. The module includes an inflatable air bag for deployment through the opening. A cover door closes the opening and is hingedly connected to the vehicle panel for movement away from the opening. An air bag deflection shield is underlying and separate from the cover door and overlying the air bag and module. The deflection shield has a forward edge hingedly connected to the module to enable the inflating air bag to pivot the deflection shield away from the module so that the deflection shield engages and moves the cover door away from the opening. A rotation limiting device limits the pivotal movement of the deflection shield to a predetermined position such that upon air bag deployment, the deflection shield directs the inflating air bag rearwardly and downwardly towards a vehicle occupant and shields the cover door from contact by the inflating air bag. The limiting device is preferably a flexible strap having first and second ends each attached to opposite side edges of the module by extending through slotted brackets. The strap preferably has a central portion overlying and fixedly attached to the deflection shield and located through slots on opposite side edges of the deflection shield.

The deflection shield preferably has an upwardly rolled rear edge forming a U-shaped cross-section creating a smooth, strong rear edge for directing the inflating air bag. The forward edge of the deflection shield also preferably forms an integral convoluted metal strap adapted for hingedly connecting the deflection shield to the module.

Accordingly, it is an object, feature and advantage of this invention to provide a device, separate from the cover door, for directing the inflating air bag rearwardly and downwardly towards a vehicle occupant.

It is also an object of this invention to provide a device which shields the cover door from contact and loading by the inflating air bag so that the cover door does not require side tethers or reinforcement and may be of a simplified non-conventional construction.

BRIEF DESCRIPTION OF THE DRAWINGS

These and other features, objects and advantages of the present invention will become apparent upon consideration of the following description, appended claims, and accompanying drawings in which:

FIG. 1 is a perspective view of a vehicle interior having an instrument panel assembly including a cover door partially-broken-away to reveal an underlying air bag deflection shield overlying an undeployed air bag.

FIG. 2 is a perspective view of an air bag module separate from the vehicle showing the air bag deflection shield overlying the air bag in the undeployed position.

FIG. 3 is a perspective view of an air bag module similar to FIG. 2, but showing the air bag in the deployed position and the air bag deflection shield in the fully opened position.

DESCRIPTION OF THE PREFERRED EMBODIMENT

Referring to FIG. 1, it is seen that a passenger vehicle includes an instrument panel assembly 10 mounted in a vehicle interior behind a windshield 12. The instrument panel assembly 10 includes a glove box 14 closed by a glove box door 16. The upper surface of the instrument panel assembly includes a generally rectangular air bag deployment opening 18 that is normally closed by a cover door 20. The cover door 20 is hingedly mounted to the instrument panel 10 so that the cover door 20 is moved out of the opening 18 to permit deployment of an inflatable air bag 22 through the opening 18, as described hereinafter. The cover door 20 may be of a conventional construction such that it provides an aesthetically pleasing closure of the opening 18 for normal passenger usage. A common conventional cover door construction includes an underlying substrate panel and an outer decorative skin held together by a layer of foam molded between the substrate and skin. The forward edge of the cover door 20 is typically hingedly mounted to the instrument panel 10 by a metal strap or flexible fabric strap.

Referring to FIG. 2, an air bag module 26 is mounted beneath the opening 18 in the instrument panel 10 to supportive vehicle structure, not shown. The air bag module 26 includes a steel reaction canister 28 which houses an inflator (not shown) underlying and operatively connected to the inflatable air bag 22.

As shown best in FIG. 2, the canister 28 of the module 26 has a transversely extending U-shaped cross-sectional lower portion 30 closed by a vertical right canister side 32 and an opposite vertical left canister side 34. The canister 28 has a rectangular top opening defined by an integral peripheral flange portion 36 extending outwardly around the upper edge of the canister 28. As shown in FIG. 3, the forwardly extending portion of the flange 36 has a plurality of apertures 46 for receiving fasteners, such as rivets 75, for anchoring a forward edge of an air bag deflection shield 50 to the air bag module 26, as discussed below. L-shaped supports 38, 40 are each attached to opposite sides 32, 34 of the canister 28 and have apertures 44 for mounting the module 26 to the vehicle.

Referring to FIGS. 1 and 2, an air bag deflection shield 50 underlies the cover door 20 and overlies the air bag module 26. The deflection shield 50 is preferably a generally rectangular metallic panel having a width less than that of the opening 18. The deflection shield 50 has a generally flat central portion 64 and a rearward portion 66 angled downwardly and rearwardly with the rearward edge 68 upwardly rolled to form a U-shaped cross-section for creating a strong, smooth rearward edge 68 for directing the air bag 22 during deployment.

As best shown in FIG. 2, the forward edge of the deflection shield 50 includes a vertical step 70 extending downwardly from the forward edge of the central portion 64 and a mounting flange 72 extending forwardly from the lower edge of the vertical step 70. This forward edge provides an integral convoluted metal strap 64, 70, 72 forming a transversely extending hinge axis about which the deflection shield 50 pivots upwardly away from the module 26 upon air bag 22 deployment. Referring to FIGS. 1 and 3, the mounting flange 72 of the metal strap has apertures 74 matably aligned for fastening, such as by rivets 75, to corresponding apertures 46 on the flange 36 of the module 26 to anchor the forward edge of the deflection shield 50 to the module 26.

As best shown in FIGS. 2 and 3, a flexible strap 62 made of a fabric material, such as that of a conventional seatbelt, has ends attached to opposite side edges of the module 26 by extending through brackets 52, not shown, and securing onto themselves, such as by stitching. The brackets 52 are fastened to the module 26 at supports 38, 40 by a fastener, such as a bolt 54.

As shown in FIG. 2, the deflection shield 50 has slotted apertures 76, 78 each extending longitudinally along an opposite side edge of the deflection shield 50 and aligned vertically adjacent above the brackets 52 when the air bag 22 is in the undeployed position. The strap 62 is routed through the slotted apertures 76, 78 of the deflection shield 50, such that a central portion 80 of the strap 62 is located for overlying the deflection shield 50.

The central portion 80 of the strap 62 is fixedly attached to the deflection shield 50 by a plurality of fasteners, such as rivets 82. FIGS. 2 and 3 illustrate an arrangement with five rivets 82 for fastening the central portion 80 of the strap 62 to the deflection shield 50. As shown in FIG. 2, the portion of the strap 62 extending between the bracket 52 and the deflection shield 50 is stored in a folded position interposed between the module 26 and deflection shield 50.

As is well-known, the inflator is actuated in response to the vehicle experiencing a predetermined vehicle deceleration causing the air bag 22 to inflate and deploy upwardly. As best shown in FIG. 3, the inflating air bag 22 engages the deflection shield 50 and forces it upwardly and away from the module 26. Upward pivotal movement of the deflection shield 50 is permitted by the bending of its integral convoluted metal strap 64, 70, 72 so that the deflection shield 50 engages and moves the overlying cover door 20 out of the opening 18. Thus, both the deflection shield 50 and the cover door 20 pivot upwardly out of the opening 18 to enable deployment of the inflating air bag 22 through the opening 18.

As best shown in FIG. 3, the length of the strap 62 limits the upward pivotal movement of the deflection shield 50 away from the module 26. When the strap 62 is fully extended as shown in FIG. 3, the deflection shield 50 is opened to a predetermined position forming a rearwardly opening angle to direct further expansion of the inflating air bag 22 rearwardly and downwardly towards a vehicle occupant. Upon air bag deployment, the deflection shield 50 engages and moves the cover door 20 until the fully extended strap 62 prohibits further pivotal movement of the deflection shield 50. Thus, the deflection shield 50, as limited by the strap 62, shields the cover door 20 from contact by the inflating air bag 22 and reduces loading on the cover door 20 during air bag 22 deployment.

Therefore, it will be appreciated that the deflection shield 50 eliminates the need for side tethers or straps on the cover door 20 or for reinforcement of the cover door 20. Furthermore, the deflection shield 50 may be added to a vehicle with a conventional cover door 20 to reduce loading on the cover door 20 during air bag deployment. However, it will also be appreciated that the cover door 20 may be of a simplified non-conventional design since the deflection shield 50 reduces loading on the cover door 20 during air bag deployment. It will also be understood that the deflection shield 50, has the advantage of being hidden from view by the overlying cover door 20 during normal vehicle use.

Thus, it is seen that this invention provides a new and improved air bag deflection shield 50 to direct the inflating air bag 22 rearwardly and downwardly towards a vehicle occupant and to shield the cover door 20 from contact by the inflating air bag 22.

While the present invention has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

1. In a vehicle having an air bag module mounted beneath an opening in a vehicle panel, the module including an inflatable air bag for deployment through the opening, and a cover door closing the opening and hingedly connected to the vehicle panel for pivotal movement away from the opening, the improvement comprising:

an air bag deflection shield underlying and separate from the cover door and overlying the air bag and module, the deflection shield having a forward edge hingedly connected to the module to enable the inflating air bag to pivot the deflection shield away from the module so that the deflection shield engages and moves the cover door away from the opening, the deflection shield having a rearward edge being upwardly rolled to form a U-shaped cross-section for creating a strong, smooth rearward edge on the deflection shield for directing the inflating air bag, and means for limiting the pivotal movement of the deflection shield to a predetermined position forming a rearwardly opening angle to direct deployment of the inflating air bag, whereby upon air bag deployment the deflection shield directs the inflating air bag rearwardly and downwardly towards a vehicle occupant and shields the cover door from contact by the inflating air bag.

2. In a vehicle having an air bag module mounted beneath an opening in a vehicle panel, the module including an inflatable air bag for deployment through the opening, and a cover door closing the opening and hingedly connected to the vehicle panel for pivotal movement away from the opening, the improvement comprising:

an air bag deflection shield underlying and separate from the cover door and overlying the air bag and module, the deflection shield having a forward edge and a rearward edge, hinging means operatively associated with the forward edge of the deflection shield to enable pivotal movement of the deflection shield by the inflating air bag away from the module so that the deflection shield engages and moves the cover door away from the opening, and a flexible strap having a predetermined length for limiting the pivotal movement of the deflection shield to a predetermined position forming a rearwardly opening angle to direct deployment of the inflating air bag, the strap having first and second ends each attached to opposite side edges of the module, and the strap having a central portion overlying the deflection shield and fixedly attached to the deflection shield by a plurality of fasteners, whereby upon air bag deployment the deflection shield directs the inflating air bag rearwardly and downwardly towards a vehicle occupant and shields the cover door from contact by the inflating air bag.

3. The improvement of claim 2 further characterized by the hinging means including a convoluted metal strap adapted for anchoring the deflection shield to the module, the metal strap being integral with the deflection shield and transversely extending along the forward edge of the deflection shield.

4. The improvement of claim 2 further characterized by the rearward edge being upwardly rolled to form a U-shaped cross-section for creating a strong, smooth rearward edge on the deflection shield for directing the inflating air bag.

5. The improvement of claim 2 further characterized by the deflection shield having first and second slots each on opposite side edges of the deflection shield to locate the central portion of the strap on the deflection shield.

6. The improvement of claim 2 further characterized by having first and second brackets carried by opposite side edges of the module each for receiving an end of the flexible strap therethrough to enable attachment of the strap to the module.

7. In a vehicle having an air bag module mounted beneath an opening in a vehicle panel, the module including an inflatable air bag for deployment through the opening, and a cover door closing the opening and hingedly connected to the vehicle panel for pivotal movement away from the opening, the improvement comprising:

an air bag deflection shield underlying and separate from the cover door and overlying the air bag and module, the deflection shield having a forward edge hingedly connected to the module to enable the inflating air bag to pivot the deflection shield away from the module so that the deflection shield engages and moves the cover door away from the opening, a flexible strap having first and second ends each attached to opposite side edges of the module and a central portion overlying the deflection shield, the strap having a predetermined length to define limited pivotal movement of the deflection shield to a predetermined position forming a rearwardly opening angle to direct deployment of the inflating air bag, and the deflection shield having first and second slots each on opposite side edges of the deflection shield to locate the central portion of the strap on the deflection shield, whereby upon air bag deployment the deflection shield directs the inflating air bag rearwardly and downwardly towards a vehicle occupant and shields the cover door from contact by the inflating air bag.

8. The improvement of claim 7 further characterized by the deflection shield having a rearward edge upwardly rolled to form a U-shaped cross-section for creating a strong, smooth rearward edge on the deflection shield for directing the inflating air bag.

9. The improvement of claim 7 further characterized by the central portion of the strap being fixedly attached to the deflection shield by a plurality of fasteners.

10. The improvement of claim 7 further characterized by having first and second brackets carried by opposite side edges of the module each for receiving an end of the flexible strap therethrough to enable attachment of the strap to the module.

11. In a vehicle having an air bag module mounted beneath an opening in a vehicle panel, the module including an inflatable air bag for deployment through the opening, and a cover door closing the opening and hingedly connected to the vehicle panel for pivotal movement away from the opening, the improvement comprising:

an air bag deflection shield underlying and separate from the cover door and overlying the air bag and module, the deflection shield having a transversely extending forward edge comprising an integral convoluted metal strap for hingedly connecting the deflection shield to the module to enable pivotal movement of the deflection shield by the inflating air bag away from the module about the forward edge so that the deflection shield engages and moves the cover door away from the opening, and a flexible strap having a predetermined length for limiting the pivotal movement of the deflection shield to a predetermined position forming a rearwardly opening angle to direct deployment of the inflating air bag, the strap having first and second ends each attached to opposite side edges of the module, and the strap having a central portion overlying the deflection shield to limit the pivotal movement of the deflection shield to the predetermined position, whereby upon air bag deployment the deflection shield directs the inflating air bag rearwardly and downwardly towards a vehicle occupant and shields the cover door from contact by the inflating air bag.

12. The improvement of claim 11 further characterized by the deflection shield having side edges spaced apart from the module.

* * * * *